United States Patent
Kao et al.

(10) Patent No.: US 8,040,102 B2
(45) Date of Patent: Oct. 18, 2011

(54) SOLAR-POWERED LED STREET LIGHT

(75) Inventors: Ching-Shang Kao, Taipei Hsien (TW); Wei-Liang Lin, Taipei Hsien (TW)

(73) Assignee: Acbel Polytech Inc., Taipei Hsien (TW)

( * ) Notice: Subject to any disclaimer, the term of this patent is extended or adjusted under 35 U.S.C. 154(b) by 457 days.

(21) Appl. No.: 12/360,168

(22) Filed: Jan. 27, 2009

(65) Prior Publication Data

US 2009/0303703 A1 Dec. 10, 2009

(30) Foreign Application Priority Data

Jun. 6, 2008 (TW) ................................ 97121070 A

(51) Int. Cl.
*H01M 10/44* (2006.01)
*H01M 10/46* (2006.01)

(52) U.S. Cl. .......... 320/101; 136/291; 362/20; 362/157; 362/183; 362/431; 362/800

(58) Field of Classification Search .................... 320/101
See application file for complete search history.

(56) References Cited

U.S. PATENT DOCUMENTS

| | | | | |
|---|---|---|---|---|
| 4,200,904 A * | 4/1980 | Doan | ............................ | 362/183 |
| 4,281,369 A * | 7/1981 | Batte | ............................ | 362/183 |
| 4,519,657 A * | 5/1985 | Jensen | ......................... | 439/191 |
| 4,841,416 A * | 6/1989 | Doss | ............................ | 362/183 |
| 5,149,188 A * | 9/1992 | Robbins | ....................... | 362/183 |
| 5,924,784 A * | 7/1999 | Chliwnyj et al. | ............. | 362/234 |
| 6,107,941 A * | 8/2000 | Jones | ............................ | 340/915 |
| 6,292,901 B1 * | 9/2001 | Lys et al. | ...................... | 713/300 |
| 6,784,357 B1 * | 8/2004 | Wang | ............................ | 136/244 |
| 7,455,435 B2 * | 11/2008 | Mathews et al. | ............... | 362/441 |
| 7,828,463 B1 * | 11/2010 | Willis | ........................ | 362/276 |
| 2003/0156012 A1 * | 8/2003 | Omidi et al. | ............. | 340/310.01 |
| 2007/0052385 A1 * | 3/2007 | Fan | ................ | 320/101 |
| 2007/0165835 A1 * | 7/2007 | Berkman | ................. | 379/399.01 |
| 2007/0287389 A1 * | 12/2007 | Pockat et al. | ................... | 455/73 |
| 2009/0040750 A1 * | 2/2009 | Myer | ............................ | 362/183 |
| 2009/0195653 A1 * | 8/2009 | Miao | ............................ | 348/149 |

* cited by examiner

*Primary Examiner* — Arun Williams
(74) *Attorney, Agent, or Firm* — Alan Kamrath; Kamrath & Associates PA

(57) ABSTRACT

A solar-powered LED street light that can immediately report its power data. The disclosed LED street light has a solar cell, a switch power supply unit, and a power cable data communicating unit. The mains power cable of the LED street light connects to the switch power supply unit for providing it with DC power. The solar cell has a solar board, a battery and a charge controller. The charge controller can also provide the LED street light with DC power. The charge controller has a power data digital output interface for connecting with the power cable data communicating unit, outputting the power data of the solar cell to the power cable data communicating unit. Through the mains power cable, the status of solar cell of each LED lamp is monitored.

15 Claims, 5 Drawing Sheets

SOLAR-POWERED LED STREET LIGHT

BACKGROUND OF THE INVENTION

1. Field of the Invention

The invention relates to a solar-powered LED street light and, in particular, to a solar-powered LED street light that immediately reports its power data.

2. Description of Related Art

As natural resources and energy will be used up soon, it becomes important to save fossil energy and develop new everlasting energy. Therefore, countries all over the world are making efforts in this direction for public constructions. Taking the street light as one example, there are more LED street lights because the LED lamp has the advantage of low power consumption. Electrical power can be greatly saved if we widely adopt the LED street lights.

Since the LED street light uses DC power and is installed outdoors, most of them are equipped with solar cells. This can save the electrical power usage. Although including solar cells is good, it is quite expensive to maintain them. Generally speaking, the solar-powered LED street light also requires mains power in addition to the solar cells so that the power supply can be alternated. For maintenance personnel, the solar cells are more likely to be damaged than home-used ones because they are exposed outdoors. In order to check whether a solar cell is damaged, the maintenance technician usually has to use a galvanometer or some detector to measure it. Alternatively, the maintenance technician can determine whether it is damaged by downloading the solar cell power data. Apparently, such a maintenance process is too slow. During the time after the solar cell is damaged and before it is repaired, the LED street light has to rely on the mains power.

SUMMARY OF THE INVENTION

In view of the foregoing, an objective of the invention is to provide a solar-powered LED street light that immediately reports its power data to a remote end. This helps shortening the maintenance time.

To achieve the above-mentioned objective, the disclosed solar-powered LED street light comprises:

an LED lamp;

a solar cell, which include a solar board, a charge controller and a battery; wherein the charge controller is electrically connected between the solar board and the battery and is connected to the LED lamp so as to convert and output the electrical power in the battery to the LED lamp, the charge controller having a power data digital output interface;

a switch power unit, which is connected to an AC power source and whose output terminal is connected to the LED lamp, for converting the AC power into DC power and outputting it to the LED lamp;

a power cable data communicating unit, which is coupled to the AC power and electrically connected to the power data digital output interface of the charge controller to extract the power data of the solar cell, the power data being modulation processed and coupled into the AC power of the power cable so that they are transmitted out.

The charge controller of the solar cell in the solar-powered LED street light is further connected to the power cable data communicating unit, through which the power data thereof are loaded into the power cable and transmitted outward. A remote power cable communicating host extracts the power data reported from each solar-powered LED street light. Therefore, the solar cell of each LED street light can be centrally controlled and immediately determined to be working or not.

Another objective of the invention is to provide a solar-powered LED street light with real-time road images. The above-mentioned LED street light is further provided with a video camera that has a video data output terminal connected with the power cable data communicating unit. The power cable data communicating unit loads the road images captured by the video camera on the LED street light and sends them outwards. Thereby, the remote power cable communicating host can extract the road images captured by the video camera on each LED street light. This achieves the objective of monitoring the road conditions in real time.

DETAILED DESCRIPTION OF THE PREFERRED EMBODIMENT

Figure 1:
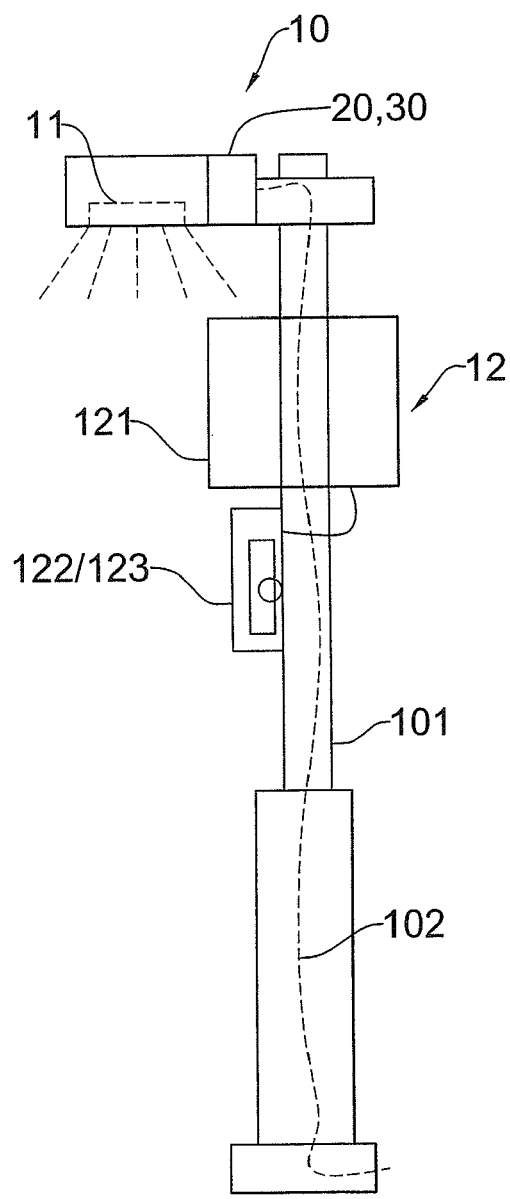
FIG. 1 is a plan view of a solar-powered LED street light in accordance with the first embodiment.
Figure 2:
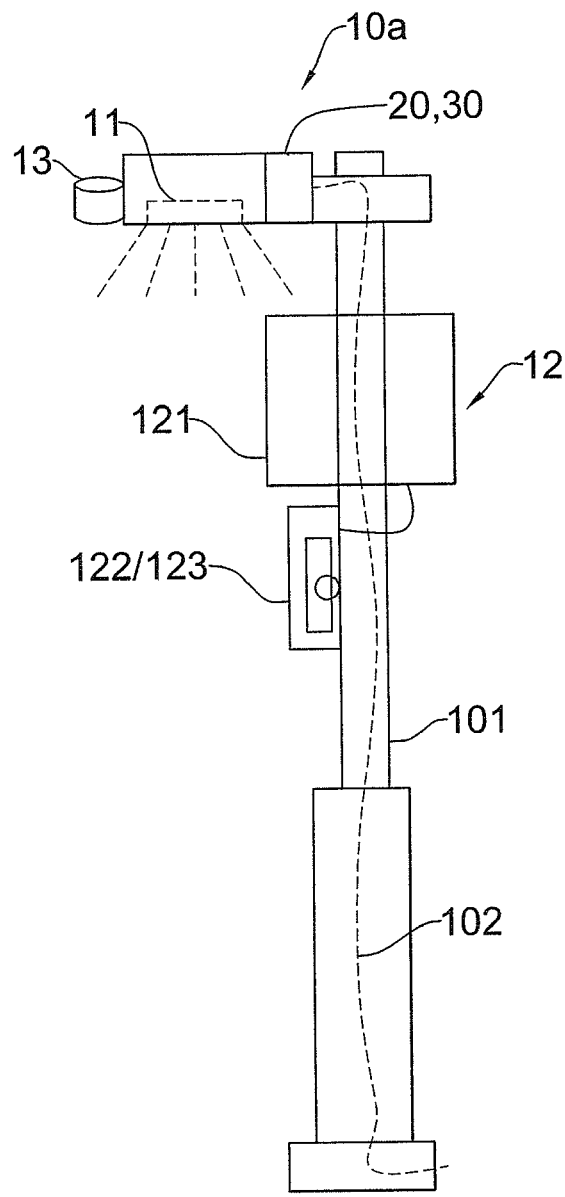
FIG. 2 is a plan view of a solar-powered LED street light in accordance with the second embodiment.

With reference to FIG. 1, a solar-powered LED street light 10 comprises a lamppost 101, an LED lamp 11, a solar cell 12, a mains power cable 102, a switch power supply unit 20, and a power cable data communicating unit 30. With further reference to FIG. 2, the second embodiment of the solar-powered LED street light 10a further includes a video camera 13 being adjacent to the LED lamp 11.

Figure 3:
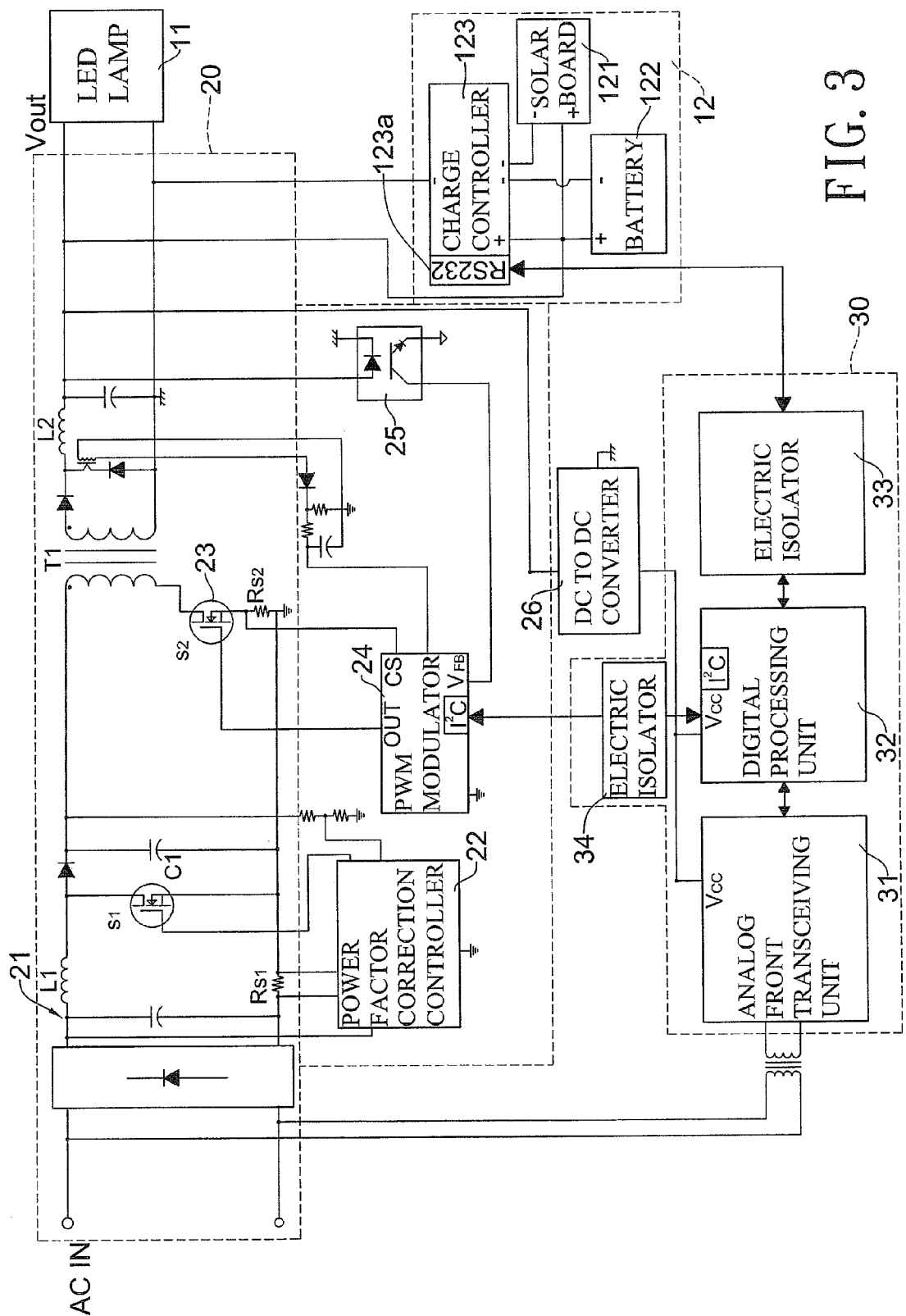
FIG. 3 is a circuit diagram for FIG. 1.
Figure 6:
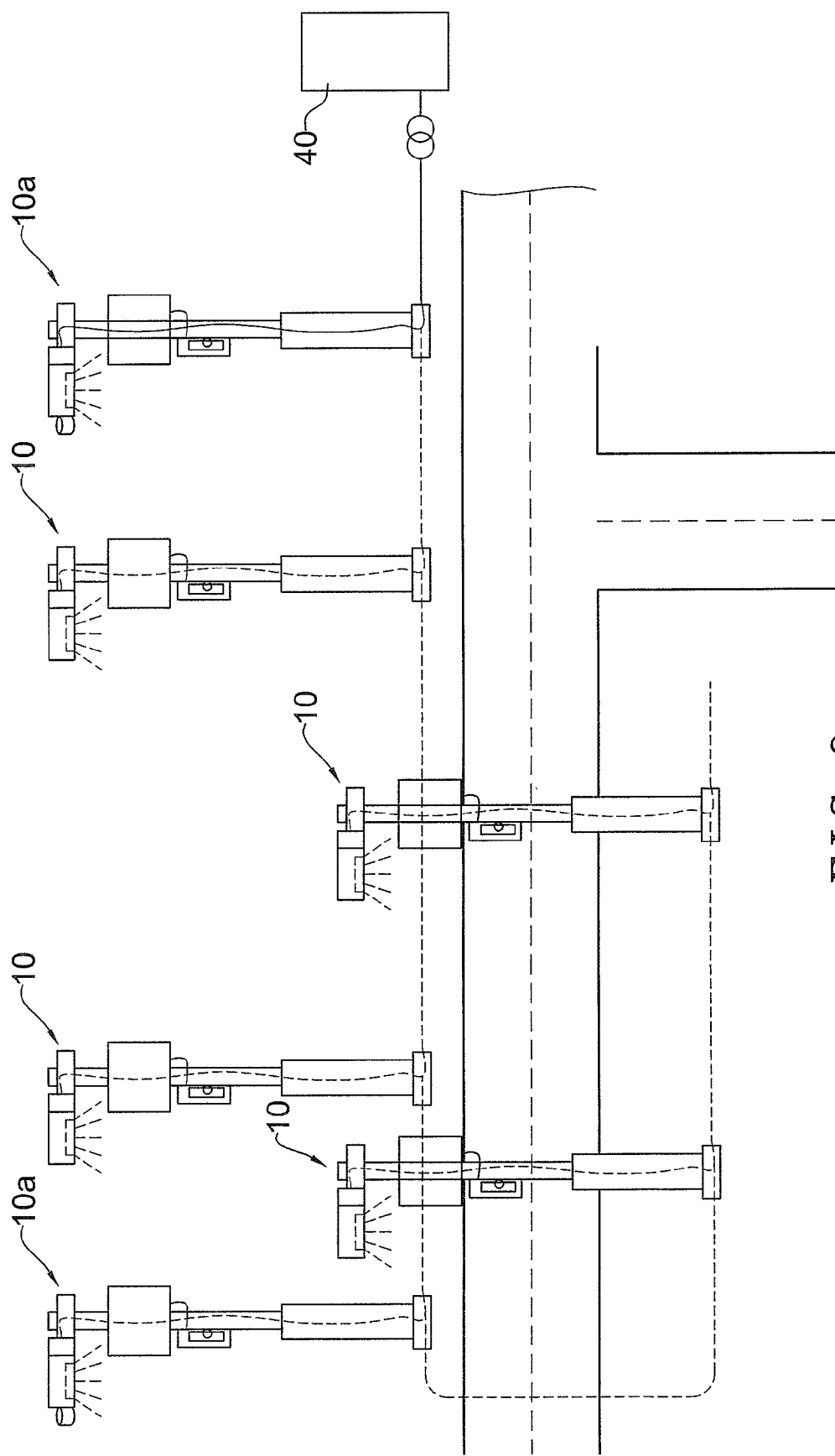
FIG. 6 shows the connection structure of a power cable network and a remote power cable communicating host in accordance with the present invention.

With reference to FIGS. 3 and 6, the solar cell 12 includes a solar board 121, a battery 122 and a charge controller 123. The solar board 121 is mounted on the lamp post 101 to absorb solar power and convert the solar power into DC power for output. The battery 122 is fixed on the lamp post 101. The charge controller 123 is mounted on the lamp post 101 and electrically connects among the solar board 121, the LED lamp 11 and the battery 122 to convert the DC power into the charging power for charging the battery 122. The charge controller 123 may controls the battery 122 to output the power to the LED lamp 11. The charge controller 123 may include a power data digital output interface 123a, which may be a serial port such as the RS-232 or USB interface.

Since the charge controller 123 is electrically connected to the solar board 121, the battery 122 and the LED lamp 11, the charge controller 123 can check the status of the battery 122. If the stored power in the battery 122 is low, the DC power output from the solar board 121 is adjusted to charge the battery 122. When the LED lamp 11 should be turned on due to dim environmental light, the battery 122 output power to activate the LED lamp 11.

The switch power supply unit 20 is connected to the mains power cable 102 to obtain an alternating power (AC). The output terminal of the switch power supply unit 20 connects to the LED lamp 11. The switch power supply unit 20 converts the AC power into DC power, which is then output to the LED lamp 11 as its operating voltage. In this embodiment, the switch power supply unit 20 is a forward power circuit. However, the switch power supply unit 20 may be alternatively implemented as a flyback power circuit or a buck power circuit. To provide DC power to the power cable data communicating unit 30, the switch power supply unit 20 further includes at least one DC to DC converter 26. The DC to DC circuit can be a buck power circuit. The input terminal of the DC to DC converter connects to the DC output terminal of the switch power supply unit 20, bucking the output voltage to a low DC voltage and supplying the low DC voltage to the power cable data communicating unit 30 as its operating voltage.

The power cable data communicating unit 30 is coupled to the mains power cable 102, and is electrically connected with the power data digital output interface 123a of the charge controller 123. The power cable data communicating unit 30 obtains the power data of the battery 122, modulates and couples the data into the Mains power cable 102. The power data of the solar cell 12 of the LED lamp 11 is transmitted out via the Mains power cable 102.

The power cable digital communicating unit 30 comprises an analog front transceiving unit 31, a digital processing unit 32, a digital communicating interface 33, and an electric isolator 34.

The analog front transceiving unit 31 electrically connects to the DC to DC converter 26 and couples to the mains power cable 102.

The digital processing unit 32 electrically connects to the DC to DC converter 26 and the analog front transceiving unit 31 to receive external data signals from the mains power cable 102 via the analog front transceiving unit 31, or to process and modulate the data and couple them to the mains power cable 102 via the analog front transceiving unit 31 for sending them out.

The digital communicating interface 33 electrically connects to the power data digital interface 123a of the charge controller 123 to obtain the power data of the battery 122 and outputs the power data to the digital processing unit 32. In this embodiment, the digital communicating interface 33 is a serial port such as the RS-232 or USB interface.

It is clear from the above description the charge controller 123 of the solar cell 12 of the solar-power LED street light 10 is connected to the power cable digital communicating unit 30. The power data of the solar cell 12 is transmitted out via the mains power cable 102. In this case, if a remote power cable communicating host 40 connects to a mains power network, it can readily extract the power data returned from all solar-powered LED street lights 10. The all statuses of the solar-powered LED street lights 10 can be centrally managed and used to determine whether individual solar cells 122 are normal or damaged.

Figure 4:
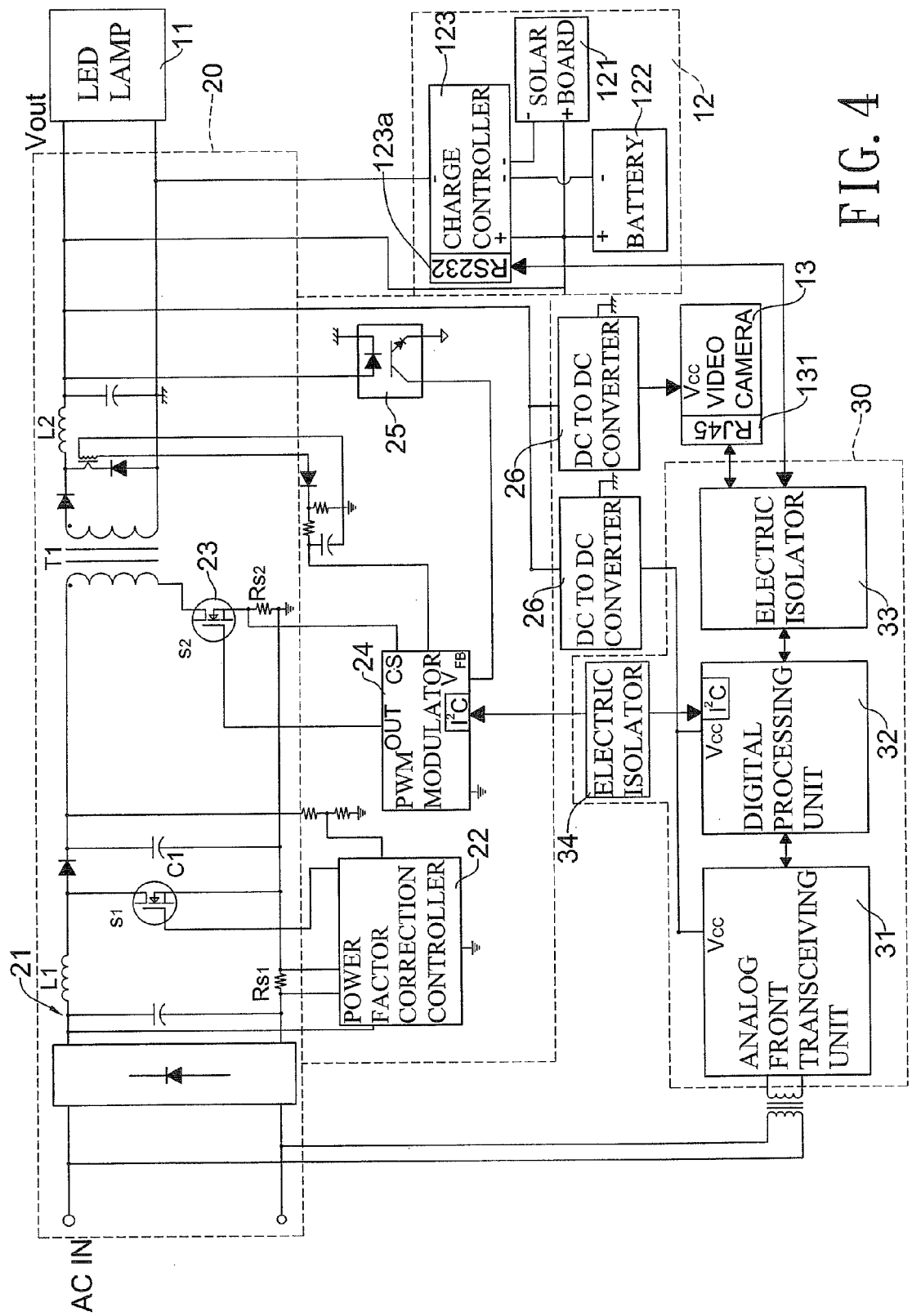
FIG. 4 is a circuit diagram for FIG. 2.

With reference to FIGS. 4 and 6, in this second embodiment, the solar-powered street light 10a further includes a video camera 13 that has a video data output terminal 131 and a power terminal Vcc. The video data output terminal 131 is electrically connected with the digital communicating interface 33 of the power cable digital-communicating unit 30. The power terminal Vcc is connected to another DC to DC converter 27 of the switch power supply. The power digital communicating unit 30 processes and adjusts road images captured by the video camera 13 on the LED street light 10a. The images are then loaded into the mains power cable 102 and transmitted outward. Therefore, the remote power cable communicating host 40 can receive the road images provided by the video cameras 13 on the LED street lights 10a, readily monitoring the road conditions.

Figure 5:
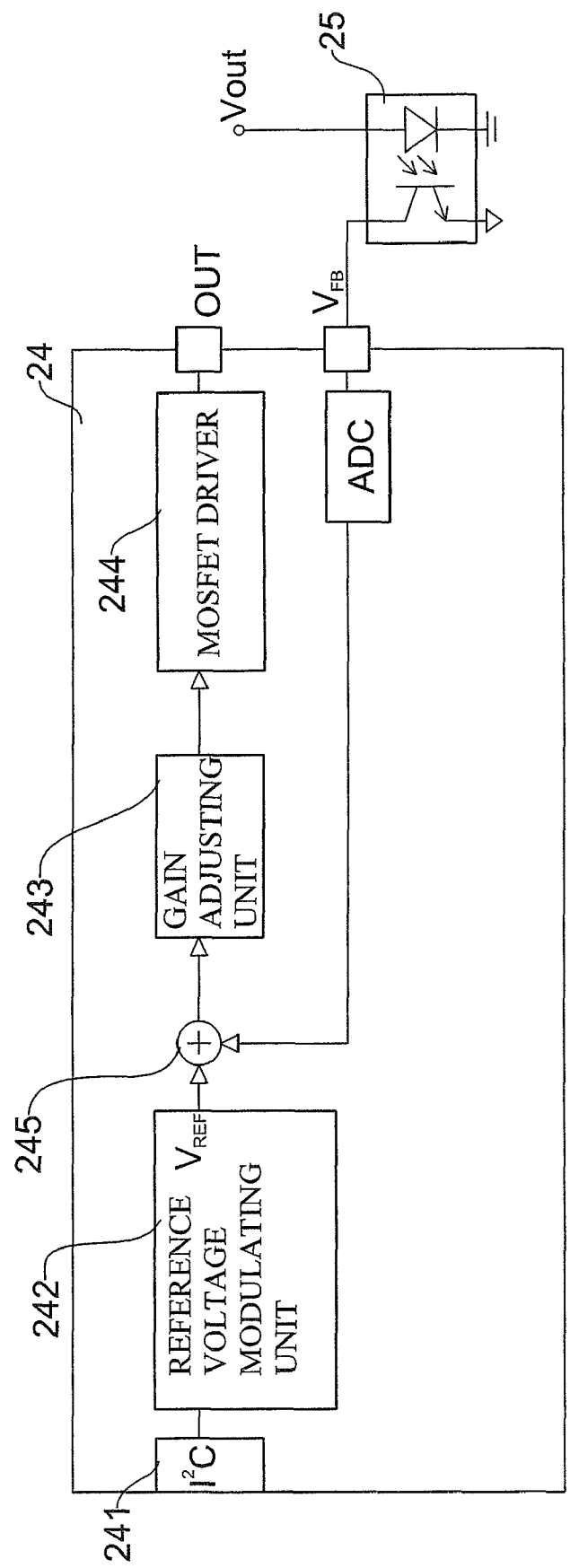
FIG. 5 is a circuit block diagram of a partial digital pulse width modulator in accordance with the present invention.

With further reference to FIGS. 4 and 5, the switch power supply circuit 20 may be a forward power circuit in this embodiment. The switch power supply circuit 20 includes a full wave rectifying filter 21, a power factor correction controller 22, a transformer T1, an active switch 23 connected to the primary side of the transformer T1 in series, a digital pulse width (PWM) modulator 24, and a photo coupler 25, HCNR200.

The digital PWM modulator 24 has at least one digital interface 241 (e.g., I$^2$C interface), a reference voltage modulating unit 242, an operating amplifier 245, a gain adjusting unit 243, a driver 244, a voltage feedback terminal V$_{FB}$ and a driving output terminal OUT.

The photo coupler 25 directly connects between the voltage feedback terminal V$_{FB}$ of the digital PWM modulator 24 and the voltage output terminal Vout of the forward flyback power circuit, thereby reflecting the DC voltage Vout thereof to the digital PWM modulator 24. Since the digital PWM modulator 24 has a digital interface 241, an electric isolator 34 can be used to obtain the command of adjusting the reference voltage output from the digital processing unit 32, thereby adjusting an internal reference voltage. Afterwards, the feedback voltage and the modulated reference voltage are compared by the operating amplifier 245. The gain of the comparison result is adjusted by the gain adjusting unit 243 and then output to the driver 244. The driver 244 outputs a pulse width signal via the driving output terminal OUT based on the comparison result. This adjusts the conduction time of the driving active switch 23 and stabilizes the output voltage.

The power cable data communicating unit 30 and the switch power supply unit 20 do not have a common ground. The output terminal (I$^2$C interface) of the digital processor 32 of the power cable data communicating unit 30 is connected to a digital interface of the digital PWM modulator 24 via the electric isolator 34 such as a transformer for changing the internal reference voltage of the digital PWM modulator 24 and accordingly changing the pulse width. Therefore, to increase the voltage and current on the secondary side of the transformer T1 of the switch power supply unit, one simply increases the reference voltage on its internal reference voltage input terminal V$_{REF}$.

Therefore, the digital processing unit 32 of the power cable data communicating unit 30 can receive the command of adjusting the brightness of the LED lamp 11 sent from the remote power cable communicating host 40. The reference voltage of the digital PWM modulator 24 is adjusted via the electric isolator 34, thereby increasing or reducing the brightness of the LED lamp 11. In order for the video camera 13 on the LED street light 10a to obtain better road condition images, the remote power cable communicating host 40 can send out a control command to increase the illuminating light of the LED lamp 11.

In summary, the solar-powered street light is more convenient for maintenance. With a video camera, the invention does not only achieve the effect of monitoring road conditions, it can also control the brightness of the LED lamp by reporting the power data of the solar cell via the power cable data communicating unit. The road images can thus be clearer.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A solar-powered LED street light comprising:
an LED lamp mounted on a lamp post;
a solar cell comprising a solar board, a charge controller and a battery, wherein the charge controller is electrically connected between the solar board and the battery and electrically connected to the LED lamp for converting power in the battery and outputting to the LED lamp, and the charge controller has a power data digital output interface;
a switch power supply unit connected to a mains power cable for converting AC power into DC power and outputting the DC power to the LED lamp; and
a power cable digital communicating unit coupled to the AC power cable and electrically connected to the power data digital output interface of the charge controller to obtain power data of the solar cell, the power data being modulated and coupled to the mains power cable for transmission.

2. The solar-powered LED street light as claimed in claim 1, wherein the solar cell comprises:
the solar board mounted on the lamp post to absorb solar optical energy and convert the solar optical energy into DC power for output;
the battery mounted on the lamp post;
the charge controller fixed on the lamp post and electrically connected among the solar board, the LED lamp, and the battery to control whether to convert the DC power for charging the battery or to output the power of the battery to the LED lamp.

3. The solar-powered LED street light as claimed in claim 2, wherein the power cable data communicating unit comprises:
an analog front transceiving unit coupled to the mains power cable;
a digital processing unit electrically connected to the analog front transceiving unit to receive external data signals from the mains power cable via the analog front transceiving unit or to process and modulate data and couple the data to the mains power cable via the analog front transceiving unit for sending them outward; and
a digital communicating interface electrically connected with the power data digital output interface of the charge controller to obtain the power data of the battery and to output the power data to the digital processing unit.

4. The solar-powered LED street light as claimed in claim 3, wherein the switch power supply unit comprises:
a full wave rectifying filter circuit, a power factor correction controller, a transformer having a primary side and a secondary side, an active switch connected to the primary side of the transformer in series, a digital pulse width (PWM) modulator and a photo coupler;
wherein the digital PWM modulator has
a digital interface connected to an output terminal of the digital processing unit through an electric isolator;
a reference voltage modulating unit connected to the digital interface to and adjusting an internal reference voltage based on a command from the digital processing unit;
a voltage feedback terminal connected to the voltage output terminal of the switch power supply unit via the photo coupler, thereby obtaining a feedback voltage;
a gain adjusting unit connected to the reference voltage modulating unit and the voltage feedback terminal via an operating amplifier, thereby comparing the internal reference voltage with the feedback voltage and adjusting a gain of the compared result;
a driver connected to the gain adjusting unit for adjusting a pulse width modulation driving signal according to the compared result; and
a driving output terminal connected to the output terminal of the driver and the active switch for controlling a conduction time of the active switch.

5. The solar-powered LED street light as claimed in claim 4 further comprising:
a DC to DC converter whose input terminal connected to a DC voltage output terminal of the switch power supply unit and reducing the output voltage of the switch power supply unit for outputting to the power cable communicating unit.

6. The solar-powered LED street light as claimed in claim 4, wherein the switch power supply unit is a flyback power circuit, a forward power circuit or a buck power circuit.

7. The solar-powered LED street light as claimed in claim 5, wherein the switch power supply unit is a flyback power circuit, a forward power circuit or a buck power circuit.

8. The solar-powered LED street light as claimed in claim 4, wherein the digital interface of the digital PWM modulator and the output terminal of the digital processing unit are $I^2C$ interfaces and the electric isolator is a transformer.

9. The solar-powered LED street light as claimed in claim 1 further comprising:
a video camera for capturing road images having an image data output terminal connected with the power cable data communicating unit so that the power data communicating unit loads the road images into the mains power cable and sends them out.

10. The solar-powered LED street light as claimed in claim 9, wherein the solar cell comprises:
the solar board mounted on the lamp post to absorb solar optical energy and convert the solar optical energy into DC power for output;
the battery mounted on the lamp post;
the charge controller fixed on the lamp post and electrically connected among the solar board, the LED lamp, and the battery to control whether to convert the DC power for charging the battery or to output the power of the battery to the LED lamp.

11. The solar-powered LED street light as claimed in claim 10, wherein the power cable data communicating unit includes:
an analog front transceiving unit coupled to the mains power cable;
a digital processing unit electrically connected to the analog front transceiving unit to receive external data signals from the mains power cable via the analog front transceiving unit or to process and modulate data and couple the data to the mains power cable via the analog front transceiving unit for sending them outward; and
a digital communicating interface electrically connected with the power data digital output interface of the charge controller to obtain the power data of the battery and to output the power data to the digital processing unit.

12. The solar-powered LED street light as claimed in claim 10, wherein the switch power supply unit comprises:
a full wave rectifying filter circuit, a power factor correction controller, a transformer having a primary side and a secondary side, an active switch connected to the primary side of the transformer in series, a digital pulse width modulator (PWM) and a photo coupler;

wherein the digital PWM has
a digital interface connected to an output terminal of the digital processing unit through an electric isolator;
a reference voltage modulating unit connected to the digital interface to and adjusting an internal reference voltage based on a command from the digital processing unit;
a voltage feedback terminal connected to the voltage output terminal of the switch power supply unit via the photo coupler, thereby obtaining a feedback voltage;
a gain adjusting unit connected to the reference voltage modulating unit and the voltage feedback terminal via an operating amplifier, thereby comparing the internal reference voltage with the feedback voltage and adjusting a gain of the compared result;
a driver connected to the gain adjusting unit for adjusting a pulse width modulation driving signal according to the compared result; and
a driving output terminal connected to the output terminal of the driver and the active switch for controlling a conduction time of the active switch.

13. The solar-powered LED street light as claimed in claim 12, further comprising:
a DC to DC converter whose input terminal connected to a DC voltage output terminal of the switch power supply unit and reducing the output voltage of the switch power supply unit for outputting to the power cable communicating unit.

14. The solar-powered LED street light as claimed in claim 13, wherein the switch power supply unit is a flyback power circuit, a forward power circuit, or a buck power circuit.

15. The solar-powered LED street light as claimed in claim 13, wherein the digital interface of the digital PWM modulator and the output terminal of the digital processing unit are I$^2$C interfaces and the electric isolator is a transformer.

* * * * *